United States Patent
Russell

(10) Patent No.: US 11,124,103 B1
(45) Date of Patent: Sep. 21, 2021

(54) CUP HOLDER INSERT

(71) Applicant: Scott P. Russell, Hebron, OH (US)

(72) Inventor: Scott P. Russell, Hebron, OH (US)

(*) Notice: Subject to any disclaimer, the term of this patent is extended or adjusted under 35 U.S.C. 154(b) by 0 days.

(21) Appl. No.: 16/793,295

(22) Filed: Feb. 18, 2020

(51) Int. Cl.
*B60N 3/10* (2006.01)

(52) U.S. Cl.
CPC .................... *B60N 3/103* (2013.01)

(58) Field of Classification Search
CPC ........ B60N 3/103; B60N 3/105; B60N 3/107; B60N 3/108; Y10S 224/926; B62B 2202/023
See application file for complete search history.

(56) References Cited

U.S. PATENT DOCUMENTS

| | | | | | |
|---|---|---|---|---|---|
| 4,040,549 | A * | 8/1977 | Sadler | ................... | B60N 3/103 224/483 |
| 5,285,953 | A * | 2/1994 | Smith | ................... | B60N 3/103 220/737 |
| 6,315,153 | B1 * | 11/2001 | Osborn | ............. | A47G 23/0216 220/737 |
| 6,506,092 | B1 * | 1/2003 | Kuracina | ........... | A47G 23/0216 215/396 |
| 6,533,232 | B1 * | 3/2003 | Aggeler | ................ | B60N 3/103 220/737 |
| 7,708,436 | B2 | 5/2010 | Lota | | |
| 7,946,422 | B1 * | 5/2011 | Bjerke | ................ | B65D 43/162 206/546 |
| 8,757,572 | B1 * | 6/2014 | Starr | .................. | A47G 23/0225 248/311.2 |
| 8,770,775 | B2 * | 7/2014 | Abro | ....................... | B60Q 3/20 362/101 |
| 9,707,708 | B2 * | 7/2017 | Bozio | ...................... | B60Q 3/20 |
| 9,809,161 | B1 | 11/2017 | Salter et al. | | |
| 9,902,319 | B1 | 2/2018 | Salter et al. | | |
| 10,293,894 | B1 * | 5/2019 | Allen | ...................... | B63B 17/00 |
| 2002/0043603 | A1 * | 4/2002 | Thomas | ................ | B60N 3/103 248/311.2 |
| 2003/0197104 | A1 * | 10/2003 | Heybl | .................... | B60N 3/108 248/311.2 |
| 2004/0213405 | A1 * | 10/2004 | Wilcox | ................... | H04M 1/04 379/455 |
| 2005/0189361 | A1 * | 9/2005 | Bresler | .................. | B65D 1/265 220/703 |
| 2005/0211714 | A1 * | 9/2005 | Kazyaka | ................ | B60N 3/107 220/737 |
| 2007/0199864 | A1 * | 8/2007 | Ebihara | ..................... | B60R 7/04 206/752 |

(Continued)

OTHER PUBLICATIONS

Spun Aluminum Large Cup Holder Insert. Product Listing [online]. Copyright © 2020 [retrieved on Oct. 4, 2019]. Retrieved from the Internet: <URL: https://www.cupholdersplus.com/spun-aluminum-large-cup-holder-insert.html>.

(Continued)

*Primary Examiner* — Brian D Nash
(74) *Attorney, Agent, or Firm* — Cramer Patent & Design PLLC; Aaron R. Cramer

(57) ABSTRACT

A cup holder insert includes a console and cup holder cover having a pair of cup holder depressions, ridges about the periphery of the insert and raised edges about the periphery of each cup holder. Each device is designed to snap fit over and about a given motor vehicle's console and cup holders.

14 Claims, 5 Drawing Sheets

(56) References Cited

U.S. PATENT DOCUMENTS

| | | | | |
|---|---|---|---|---|
| 2011/0000925 | A1* | 1/2011 | Okamoto | B60N 3/103 |
| | | | | 220/738 |
| 2012/0298708 | A1* | 11/2012 | DeAngelo | B60R 11/0252 |
| | | | | 224/567 |
| 2013/0206782 | A1* | 8/2013 | Lee | B60N 3/101 |
| | | | | 220/737 |
| 2016/0075266 | A1* | 3/2016 | Ghyvoronsky | B60N 3/103 |
| | | | | 296/37.12 |
| 2016/0194113 | A1* | 7/2016 | Aquino | A47G 23/032 |
| | | | | 220/737 |
| 2016/0272100 | A1* | 9/2016 | Lliorca | A47G 23/02 |
| 2016/0304019 | A1* | 10/2016 | Dargavell | B60N 3/106 |
| 2018/0281654 | A1* | 10/2018 | Adams | B60N 3/103 |
| 2020/0062160 | A1* | 2/2020 | Stock | B60R 7/04 |

OTHER PUBLICATIONS

Cup Holder Insert Fits 05-17 Toyota Tacoma Black Center Console Right Left. Product Listing [online]. Copyright © 1995-2020 eBay Inc. [retrieved on Oct. 4, 2019]. Retrieved from the Internet: <URL: https://www.ebay.com/itm/Cup-Holder-fits-Toyota-Tacoma-Center-Console-Front-Bench-Seat-Insert-RH-LH-/391858478027>.

2004-2009 Hyundai Tucson Genuine Rubber 2 Cup Holder Inserts New. Product Listing [online]. Copyright © 1995-2020 eBay Inc. [retrieved on Oct. 4, 2019]. Retrieved from the Internet: <URL: https://www.ebay.com/tm/2004-2009-Hyundai-Tucson-Genuine-Rubber-2-Cup-Holder-Inserts-NEW-/281134486342>.

KAZeKUP® Cup Holder Insert improves your cup holder. Product Listing [online]. Gifts by Kaz Copyright © 2020 [retrieved on Oct. 4, 2019]. Retrieved from the Internet: <URL: https://giftsbykaz.com/product/kaz-e-kup>.

* cited by examiner

CUP HOLDER INSERT

FIELD OF THE INVENTION

The presently disclosed subject matter is directed to a cup holder insert.

BACKGROUND OF THE INVENTION

Among the many chores that we all must face is the task of keeping our cars clean and good-looking. For many Americans, their car is a source of personal pride and keeping it good looking is not just a chore, it is an obsession. This obsession of course includes the interior of the car as well. The upholstery and carpeting must be vacuumed and periodically cleaned to keep it looking its best. Dashes and instrument panels must be wiped down and brushed to remove all traces of dust and dirt. One other area that is prone to collecting spills and debris is that of the cup holders and small compartments in the dash and door areas.

However, no matter how much vacuuming, wiping, and brushing one does, there always seems to be some dirt and debris left behind. While passenger areas and cargo areas are provided with protective mats that can be removed for easy cleaning, cup holders and small storage compartments, which can be even dirtier, are offered no protection at all. Accordingly, there exists a need for a means by which cupholders and storage compartments can be provided with removable protection in the same manner as protective floor mats. The development of the protective insert for vehicle interior compartments fulfills this need.

SUMMARY OF THE INVENTION

The principles of the present invention provide for a protective insert, comprises a cup holder insert which is inserted into an opening on an interior of a motor vehicle. The cup holder insert provides for a cup sidewall body, a cup bottom that is flat, and a cup rim which is circular. The cup sidewall body and the cup bottom may form a closed cup-like structure that retains liquid, condensation, and debris that tend to accumulate in a vehicle cupholder. The cup holder insert may be specifically sized and formed for the opening on the specific year, make, and model of the motor vehicle. The cup holder insert may be a one-piece waterproof configuration and may have a tubular sidewall cup body. The cup holder insert may be made of a pliable plastic. The pliable plastic may be a material selected from the group consisting of rubber-like thermoplastic elastomer, polyethylene terephthalate high-density polyethylene, polycarbonate, polylactide, acrylic, acrylonitrile butadiene, styrene, fiberglass, or nylon.

An interior of the cup sidewall body may be provided with a plurality of vertical channels that run from the cup rim to the cup bottom. The vertical channels may allow for condensate present on a cup contained within the cup holder insert to be routed to the cup bottom. The vertical channels may allow for air to exit the cup holder insert as the cup is placed inside, as well as air to enter the cup holder insert as the cup is removed from the cup holder insert.

A protective insert also comprises a storage compartment insert which is inserted into an opening on an interior of a motor vehicle. The storage compartment insert provides for a sidewall body, a bottom that is flat, and a rim. The sidewall body and the bottom may form a closed structure that retains liquid, condensation, and debris that tend to accumulate in a vehicle cupholder. The storage compartment insert may be specifically sized and formed for the opening on the specific year, make, and model of the motor vehicle. The storage compartment insert may be a one-piece waterproof configuration and may have a tubular sidewall body. The storage compartment insert may be made of a pliable plastic and may be selected from a group consisting of rubber-like thermoplastic elastomer, polyethylene terephthalate high-density polyethylene, polycarbonate, polylactide, acrylic, acrylonitrile butadiene, styrene, fiberglass, or nylon.

An interior of the sidewall body may be provided with a plurality of vertical channels that run from the rim to the bottom. The vertical channels may allow condensate present on a cup contained within the storage compartment insert to be routed to the cup bottom. The vertical channels may allow for air to exit the storage compartment insert as the cup is placed inside, as well as air to enter the storage compartment insert as the cup is removed from the storage compartment.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
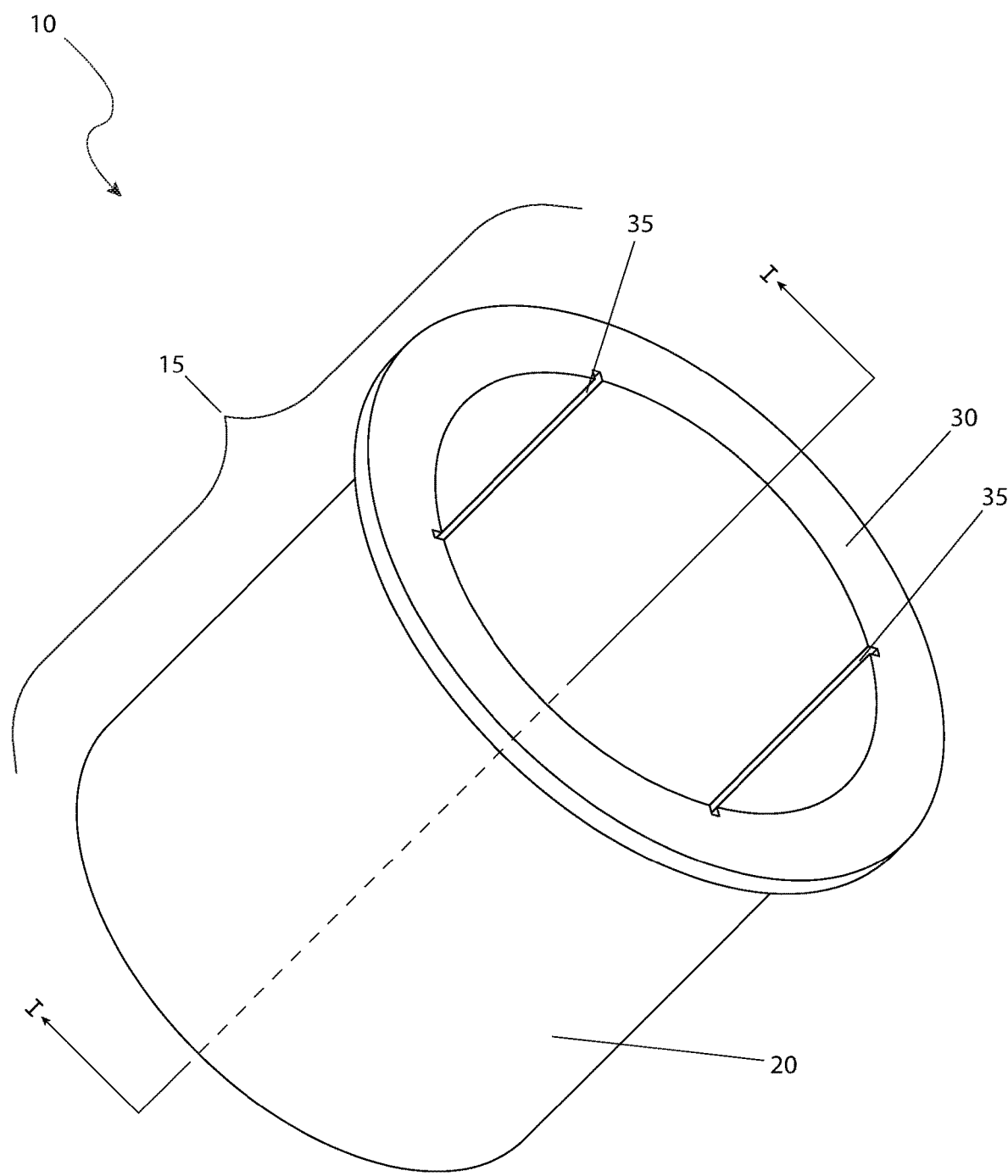
FIG. 1 is a perspective view of the protective insert 10, according to the preferred embodiment of the present invention.

DESCRIPTIVE KEY 10 protective insert
15 cup holder insert
20 cup sidewall body
25 cup bottom
30 cup rim
35 vertical channel
40 storage compartment insert
45 sidewall
50 upper rim
55 cavity
60 cup holding area
65 rolled edge
70 motor vehicle passenger compartment
75 drink holder
80 door storage compartment
85 center console
90 dash compartment
95 glove box

DESCRIPTION OF THE PREFERRED EMBODIMENTS

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. DETAILED DESCRIPTION OF THE FIGURES

Referring now to FIG. 1, a perspective view of the protective insert 10, according to the preferred embodiment of the present invention is disclosed. The protective insert 10 (herein also described as the "insert") 10, includes a pliable plastic that is inserted into various openings or compartments 70, 80, 90 on the interior of a motor vehicle. These inserts include but, are not limited to: a cup holder insert 15 as shown, interior storage compartments 70, 80, 90, glove boxes, console boxes, removable trays, and the like. Each insert 10 is specifically sized and formed for the specific opening on the specific year, make, and model, of motor vehicle. The cup holder insert 15 provides for a cup sidewall body 20 that is tubular in configuration, a cup bottom 25 (not shown due to illustrative limitations), that is flat in configuration, and a cup rim 30 which is circular in configuration. The cup holder insert 15 as well as all insert 10 made with the teachings of the present invention, are all of one-piece waterproof configuration in an injection molding process. The material of construction is envisioned to be a rubber-like Thermoplastic Elastomer (TPE) that is pliable and flexible as well as being completely recyclable. However, other materials such as Polyethylene Terephthalate (PETE or PET) High-Density Polyethylene (HDPE), polycarbonate, polylactide, acrylic, acrylonitrile butadiene, styrene, fiberglass, or nylon may be considered as materials of construction. As such, the specific material of construction used with the insert 10 is not intended to be a limiting factor of the present invention.

The cup sidewall body 20 and the cup bottom 25 form a closed cup-like structure that retains liquid such as beverage spills and condensation as well as crumbs, dirt, and debris that tend to accumulate in vehicle cupholders. The interior of the cup sidewall body 20 is provided with multiple vertical channel 35 that run in a vertical manner from the cup rim 30 to the cup bottom 25. The vertical channel 35 provide two (2) functions. First, the vertical channel 35 allow any condensate that may be present on a beverage cup contained within the cup holder insert 15 to be routed to the cup bottom 25. Second, the vertical channel 35 allows for air to exit the cup holder insert 15 as a tight-fitting cup is placed inside, as well as air to enter the cup holder insert 15 as a tight-fitting cup is removed from the cup holder insert 15.

Figure 2:
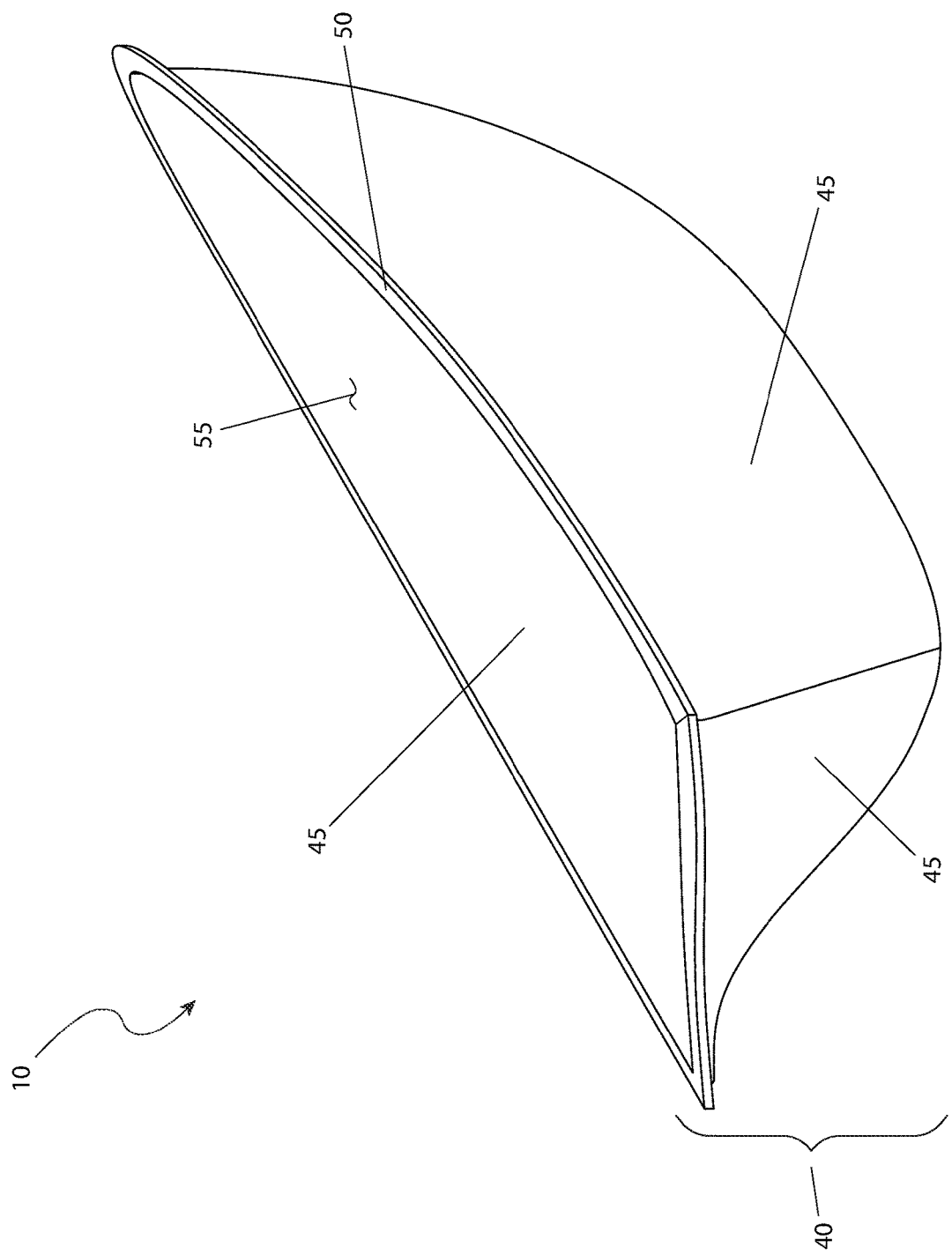
FIG. 2 is a perspective view of the protective insert 10, according to an alternate embodiment of the present invention.

Referring next to FIG. 2, a perspective view of the insert 10, according to an alternate embodiment of the present invention is depicted. This embodiment is that of a storage compartment insert 40, such as what may be found in a door, center console, or similar location. The storage compartment insert 40 includes multiple sidewalls 45 arranged in that of a general tetrahedron as shown, or of a rectangular parallelepiped should four sides be provided. As is the case with the cup holder insert 15 (as shown in FIG. 1), an upper rim 50 is provided to engage any profiles edges of the vehicle's storage compartment to aid in securement as well as removal. As such, the storage compartment insert 40 provides for an interior cavity 55 which is only slightly smaller than the cavity into which it is inserted. It is noted that the exact size and configuration of the storage compartment insert 40 is virtually limited and unconstrained. It is envisioned to range from a few inches in total length for small dash mounted compartments up to several feet for large door storage compartments or storage compartments found in cargo areas of SUV's and pickup trucks.

Figure 3:
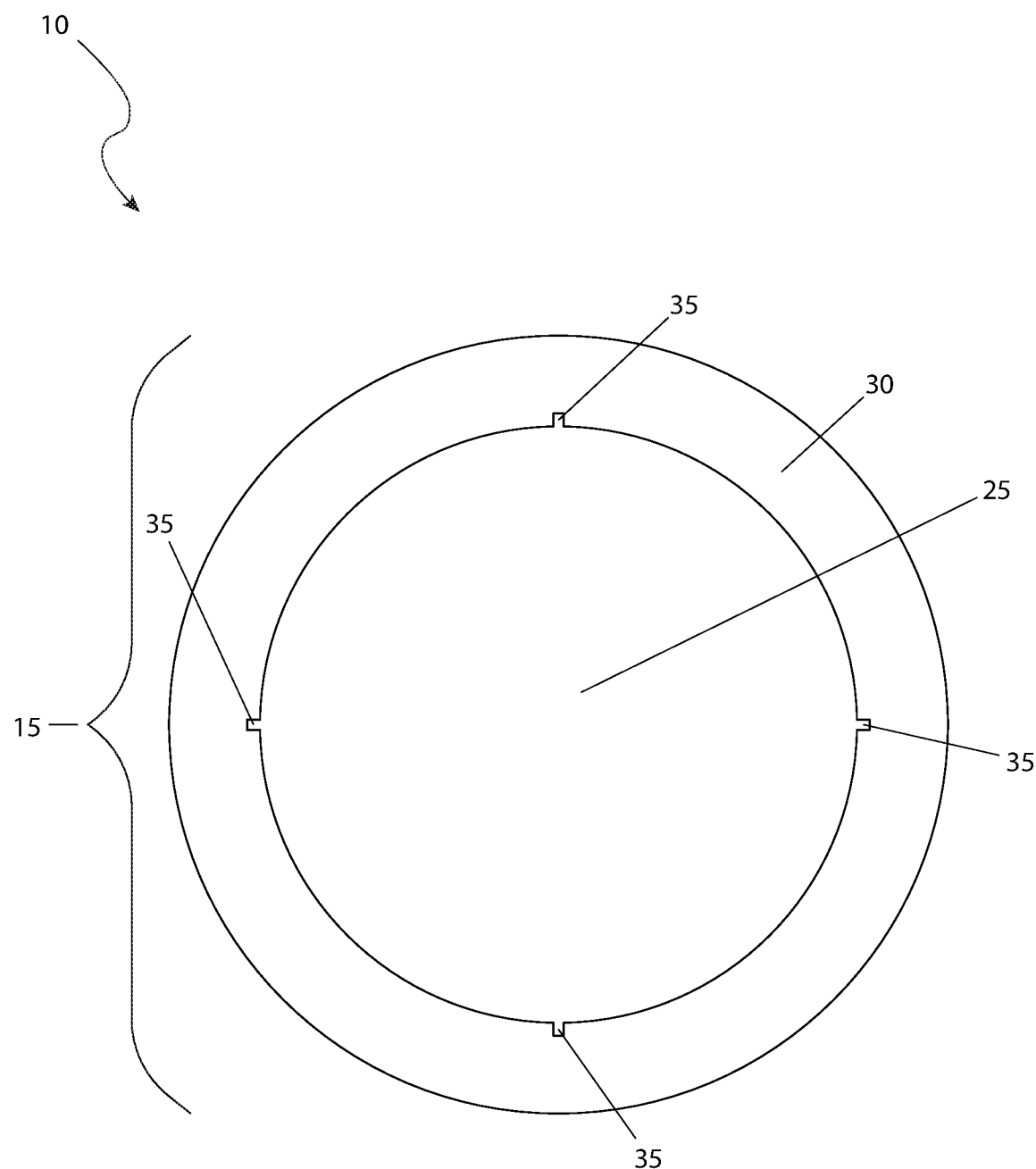
FIG. 3 is a top view of the protective insert 10, according to the preferred embodiment of the present invention.

Referring now to FIG. 3, a top view of the insert 10, according to the preferred embodiment of the present invention is shown. This view provides additional clarification on the cup holder insert 15 and the general arrangement of the cup bottom 25, the cup rim 30, and the vertical channel 35 upon which the cup holder insert 15 is comprised. It is noted that the quantity of four (4) vertical channel 35 is for illustrative purposes only with more or fewer complying with the teachings of the insert 10 in an equally effective manner. The exact number of vertical channels 35 is not intended to be a limiting factor of the present invention.

Figure 4:
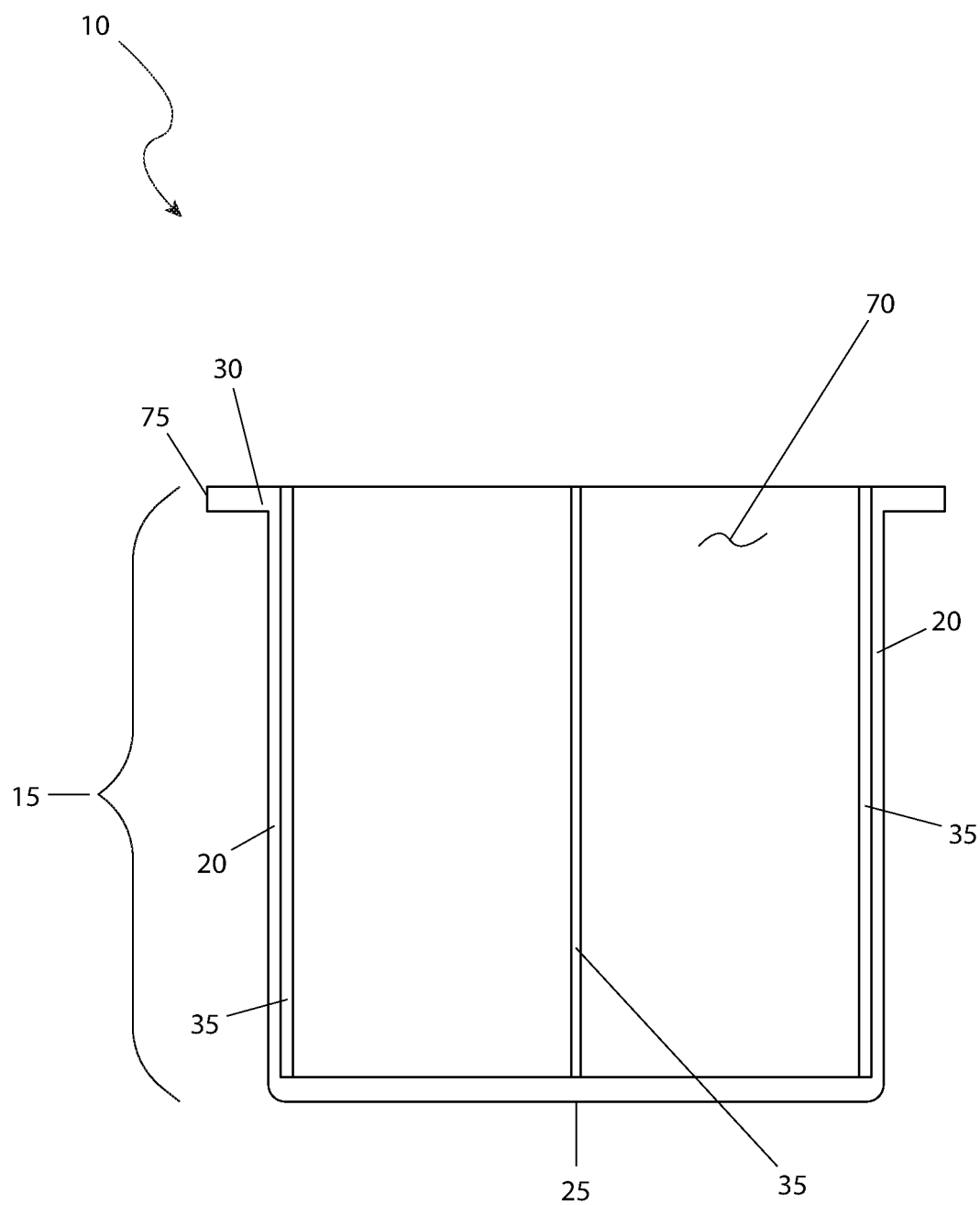
FIG. 4 is a sectional view of the protective insert 10, as seen along a line I-I, as shown in FIG. 1, according to the preferred embodiment of the present invention; and, FIG. 5 is a pictorial view of the protective insert 10, according to the both the preferred and alternate embodiments of the present invention.

Referring next to FIG. 4, a sectional view of the insert 10, as seen along a line I-I, as shown in FIG. 1, according to the preferred embodiment of the present invention is disclosed. A cup holding area 60 is produced between the cup sidewall body 20 and the cup bottom 25 which holds any spilled liquid (beverage) as well as crumbs and debris. The cup holder insert 15 is formed with the addition of the cup rim 30. The cup rim 30 is provided with a rolled edge 65 around the perimeter to aid in aesthetics as well as preen inadvertent dislodgement. The vertical channel 35 (shown via a dashed line due to its hidden nature), allows for air movement from the cup rim 30 to the cup bottom 25 even with a tight-fitting cup located inside.

Figure 5:
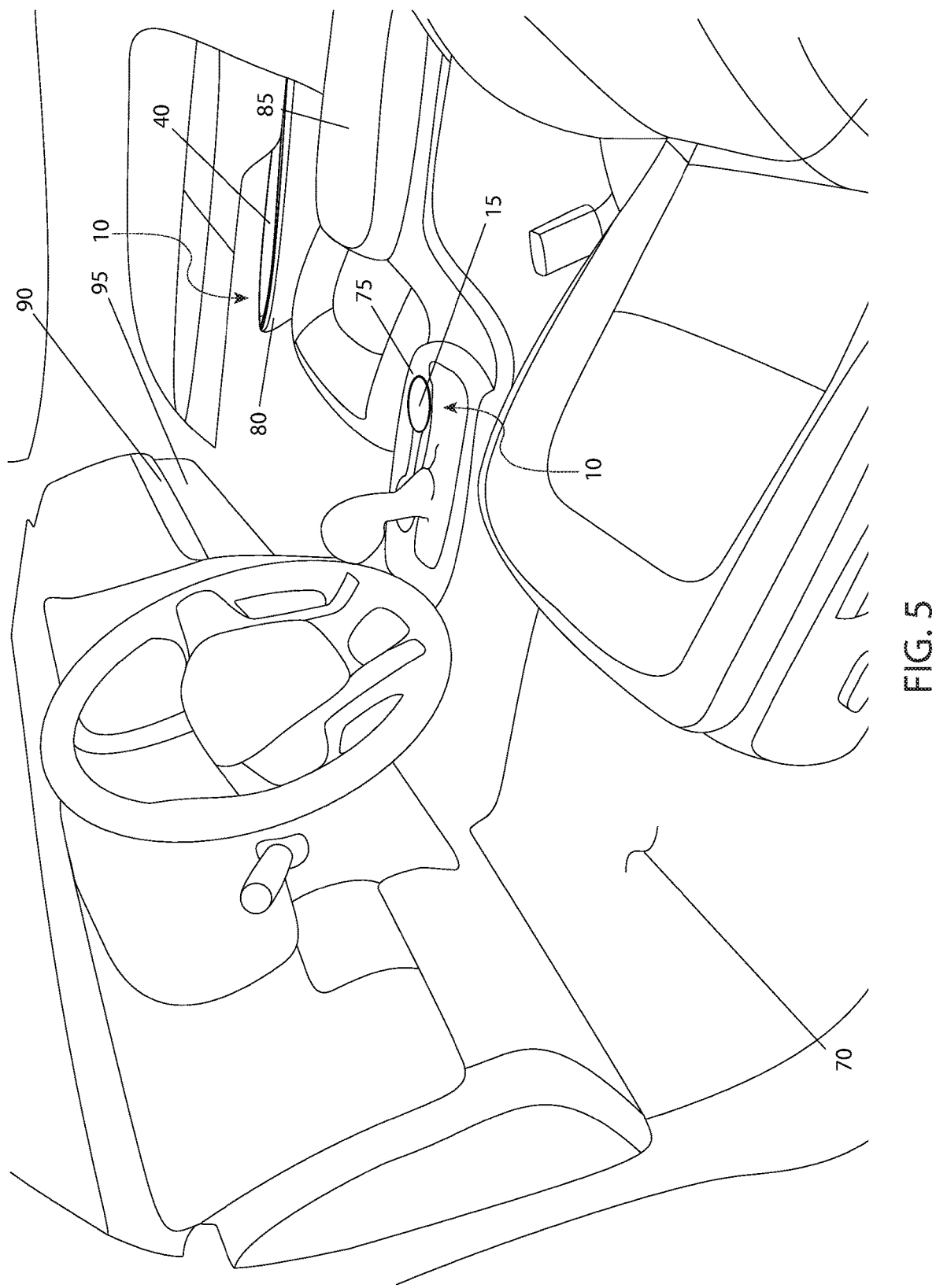

Referring to FIG. 5, a pictorial view of the insert 10, according to the both the preferred and alternate embodiments of the present invention is depicted. A motor vehicle passenger compartment 70 provides typical storage locations such as drink holder 75, a door storage compartment 80, a center console 85, a dash compartment 90, a glove box 95 or the like. The cup holder insert 15 of the preferred embodiment is inserted into the drink holder 75, while the storage compartment insert 40 is inserted into the door storage compartment 80. It is noted that any and all storage compartments can benefit from the teachings of the insert 10 system. When dirty or otherwise contaminated, the insert 10 is simply removed whereupon it can be cleaned with a water hose, at a sink, or even in a dishwasher. Said insert 10 are simply replaced when cleaned.

2. OPERATION OF THE PREFERRED EMBODIMENT

The preferred embodiment of the present invention can be utilized by the common user in a simple and effortless manner with little or no training. It is envisioned that the insert 10 would be constructed in general accordance with FIG. 1 through FIG. 5. The user would procure the insert 10 from conventional procurement channels such as auto part stores, mail order and internet supply houses and the like. As each cup holder insert 15 or storage compartment insert 40 must be specifically made for the specific vehicle, special attention would be paid when ordering.

After procurement and prior to utilization, the insert 10 would be prepared in the following manner: the original storage compartment such as the drink holder 75, the door storage compartment 80, the center console 85, the dash compartment 90 or the glove box 95 would be cleaned if needed; next, the new or cleaned insert 10 such as the cup holder insert 15 or the storage compartment insert 40 would be inserted into the respective compartment where it would be held by friction fit.

During utilization of the insert 10, the following procedure would be initiated: various conventional objects such as beverage glasses, bottles, cans, or the like would be placed in the cup holder insert 15 while personal items, such as cell phones, candy, mints, napkins, food, personal care items, loose change and the like would be placed in the insert 10; any leakage, drips, crumbs, remnants, dirt, debris and the like would be retained by the insert 10; when such unwanted material becomes excessive, the insert 10 is simply removed from the motor vehicle passenger compartment 70 where it can be cleaned with a hose, at a sink, in a dishwasher, or similar location.

After cleaning of the insert 10, it is simply replaced in the respective storage compartment, where it can be re-used over and over in a repeating and cyclical pattern.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A protective insert, comprising:
   a cup holder insert inserted into an opening on an interior of a motor vehicle, the cup holder insert provides for a cup sidewall body, a cup bottom that is flat, and a cup rim which is circular;
   wherein the cup holder insert is a one-piece waterproof configuration;
   wherein an interior of the cup sidewall body is provided with a plurality of vertical channels that run from the cup rim to the cup bottom; and
   wherein the cup rim includes a rolled edge around the perimeter to aid in aesthetics as well as preen inadvertent dislodgement.

2. The protective insert according to claim 1, wherein the cup sidewall body and the cup bottom form a closed cup-like structure that retains liquid, condensation, and debris that tend to accumulate in a vehicle cupholder.

3. The protective insert according to claim 1, wherein the cup holder insert has a tubular sidewall cup body.

4. The protective insert according to claim 1, wherein the cup holder insert is made of a pliable plastic.

5. The protective insert according to claim 4, wherein the pliable plastic is a material selected from the group consisting of rubber-like thermoplastic elastomer, polyethylene terephthalate high-density polyethylene, polycarbonate, polylactide, acrylic, acrylonitrile butadiene, styrene, fiberglass, or nylon.

6. The protective insert according to claim 1, wherein the vertical channels allows condensate present on a cup contained within the cup holder insert to be routed to the cup bottom.

7. The protective insert according to claim 6, wherein the vertical channels allows for air to exit the cup holder insert as the cup is placed inside, as well as air to enter the cup holder insert as the cup is removed from the cup holder insert.

8. A protective insert, comprising:
   a storage compartment insert inserted into an opening on an interior of a motor vehicle, the storage compartment insert provides for a sidewall body, a bottom that is flat, and a rim;
   wherein the cup holder insert is a one-piece waterproof configuration;
   wherein an interior of the cup sidewall body is provided with a plurality of vertical channels that run from the cup rim to the cup bottom; and
   wherein the cup rim includes a rolled edge around the perimeter to aid in aesthetics as well as preen inadvertent dislodgement.

9. The protective insert according to claim 8, wherein the sidewall body and the bottom form a closed structure that retains liquid, condensation, and debris that tend to accumulate in a vehicle cupholder.

10. The protective insert according to claim 8, wherein the storage compartment insert has a tubular sidewall body.

11. The protective insert according to claim 8, wherein the storage compartment insert is made of a pliable plastic.

12. The protective insert according to claim 11, wherein the pliable plastic is a material selected from the group consisting of rubber-like thermoplastic elastomer, polyethylene terephthalate high-density polyethylene, polycarbonate, polylactide, acrylic, acrylonitrile butadiene, styrene, fiberglass, or nylon.

13. The protective insert according to claim 8, wherein the vertical channels allows condensate present on a cup contained within the storage compartment insert to be routed to the cup bottom.

14. The protective insert according to claim 13, wherein the vertical channels allows for air to exit the storage compartment insert as the cup is placed inside, as well as air to enter the storage compartment insert as the cup is removed from the storage compartment.

* * * * *